United States Patent [19]
Kjaer et al.

[11] Patent Number: 5,547,691
[45] Date of Patent: Aug. 20, 1996

[54] METHOD OF PRODUCING CHEESE AND PRODUCT THEREOF

[75] Inventors: Bjarne Kjaer; Bent Pedersen; Jens B. Kjaer, all of Hjallerup, Denmark

[73] Assignee: Tetra Laval Holdings & Finance S.A., Switzerland

[21] Appl. No.: 318,710

[22] PCT Filed: Apr. 7, 1993

[86] PCT No.: PCT/DK93/00131

§ 371 Date: Dec. 16, 1994

§ 102(e) Date: Dec. 16, 1994

[87] PCT Pub. No.: WO93/20704

PCT Pub. Date: Oct. 28, 1993

[30] Foreign Application Priority Data

Apr. 10, 1992 [DK] Denmark ................................. 0491/92
Dec. 30, 1992 [DK] Denmark ................................. 1582/92

[51] Int. Cl.[6] ..................................................... A23C 9/142
[52] U.S. Cl. ................................. 426/36; 426/38; 426/39; 426/40; 426/42; 426/43; 426/491; 426/582
[58] Field of Search ............................... 426/36, 38, 39, 426/40, 42, 43, 401, 409, 582, 491

[56] References Cited

U.S. PATENT DOCUMENTS

| | | | |
|---|---|---|---|
| 4,518,616 | 5/1985 | Czulak | 426/582 |
| 4,826,701 | 5/1989 | Joo et al. | 426/401 |
| 5,334,398 | 8/1994 | Sueyasu et al. | 426/38 |
| 5,356,639 | 10/1994 | Jameson et al. | 426/582 |

*Primary Examiner*—Helen Pratt
*Attorney, Agent, or Firm*—Watov & Kipnes, P.C.

[57] ABSTRACT

A method of cheese production using ultrafiltrated, concentrated milk, to which is optionally added a further retentate made from ultrafiltrated milk which has been acidified with at least one starter culture to obtain a pH value of from 4.5 to 5.6. Salt and other additives are added and while supplying cheese rennet, the retentate is pumped into cheese molds or ready-made packages in which the cheese receives a final heat treatment at from 18° to 65° C. for a period of from 4 to 36 hours.

22 Claims, No Drawings

METHOD OF PRODUCING CHEESE AND PRODUCT THEREOF

FIELD OF THE INVENTION

The present invention relates to a method of producing cheese on the basis of ultrafiltration-concentrated milk and cheese produced by the method.

A commonly used method of cheese production on the basis of ultrafiltration-concentrated milk includes in the addition of starter culture to obtain a pH-value of about 6 followed by addition of rennet, preferably chymosin, whereupon the cheese milk still in its fluid state is dosed into molds or directly into tins. After coagulation and final acidification, salt in its dry state is added. Depending on the size of the cheese, an acceptable salt distribution is obtained within about nine days and nights, but the salt diffusion may take up to 42 days and nights, In the method described in AU-B-32175/84 concentrated cheese milk is admixed with usual additives, including sodium chloride and rennet, and acidogene in the form of glucono-delta-lacton (GDL), which gradually acidify the milk by cleaving off hydrolytically glyconic acid, following which the cheese milk, still in its fluid state, is dosed into individual packages. Rennetting, acidification and coagulation are effected after a few hours in the packaging. In this method 3.5% of non-milk additives in the form of GDL or other non-bacterial acidogenes are used. The chemical non-bacterial acidification of the cheese provides no ripening, i.e. no development of flavors, with enzymes from starter culture. Here the ripening is dictated solely by rennet enzyme and fat decomposition, the latter being intensified by homogenization of the cheese milk both prior to and following concentration.

U.S. Pat. No. 4,268,528 discloses a method of the production of cheese wherein a mixture of a whole-milk ultrafiltration-retentate and an ultrafiltration-retentate of a lactic acid-fermented milk having a pH-value $\leq 4.4$ is cooled to between 0 and 4° C. during stirring to resuspend flocculated casein, is heated to above 4° C. and rennet is added following which the casein coagulates. Acidification of the milk prior to the ultrafiltration results in more calcium being filtered off as the amount of dissolved calcium is higher at a low pH-value. Acidification of milk to a pH-value of about 4.6, which is the isoelectrical point of the casein, usually effects flocculation which impairs a subsequent rennet coagulation. In the method described the flocculated casein is resuspended and normal rennet coagulation is obtained.

In a normal continuous cheese production where the still fluid cheese curd is poured into ready-made packages which are sealed hermetically it has not been possible so far to vary the flavor and texture of the finished cheese after the filling and sealing of the package.

Furthermore it has not been possible to continuously produce cheese with taste character coming from impure or uncharacterized bacteria cultures, such as bacteria from non-pasteurized milk or whey from the previous day's cheese production as it is practiced in conventional cheese production as such cultures may have undesirable properties such as overdevelopment of taste and air formation.

It is the object of the invention to be able to produce cheese on the basis of acidified ultrafiltration-concentrated milk (retentate) in a continuous method at a uniform temperature wherein rennetting and coagulation are effected after the filling into the ready-made packages, where differentiated heat treatment may be used to obtain differentiated products and where the desired salt concentration and distribution are obtained immediately.

It is a further object of the invention to produce cheese with accelerated ripening and increased opportunity for taste control by adding at least one type of ripened curd to the acidified retentate wherein the milk components may optionally be adjusted or by adding a taste concentrate made by the fermentation of permeate enriched with milk protein and optionally milk fat.

It is a further object of the invention to be able to produce cheese with a taste character deriving from impure bacteria cultures with known taste character, e.g. bacteria from non-pasteurized milk, from local cheese specialties or whey from the previous day's cheese production, without such impure bacteria cultures being transferred to the cheese and causing development of air.

It is furthermore an object of the invention to be able to vary taste, texture, etc., during the cheese production by use of several different starter cultures. A mixture of starter cultures in the same acidification tank is undesirable as it usually results in only one culture proliferating in the cheese milk, seeing that the pH optimum, temperature optimum, etc., differ for the different cultures.

It is a further object of the invention to obtain a simplification of the production methods by continuous production of cheese in ready-made packages.

SUMMARY OF THE INVENTION

These objects are obtained with the method according to the invention which method comprises optionally adding acidified retentate which is subsequently pasteurized to the retentate from the ultrafiltrated milk, acidifying the mixture with at least one starter culture to obtain a pH-value of from 4.5 to 5.6, whereupon salt and optionally other additives are added in the desired concentration, and pumping the retentate, while supplying rennet, into cheese moulds or ready-made packings, characterized in that the cheese is subjected to a final treatment in said cheese molds or ready-made packings under heat treatment at from 18° to 65° C. during a period of from 4 to 36 hours.

DETAILED DESCRIPTION OF THE INVENTION

I) In a preferred embodiment whole milk, skim milk or a similar non-acidified milk product is ultra-filtrated with a concentration factor of from 2 to 6 times, and the retentate is collected in a number of acidification tanks corresponding to the number of starter cultures used. To each tank one starter culture is added, which is selected from among low-flavor starter cultures, such as O-culture (C.H.O.-culture No. 171, 173, etc.) and flavour-developing starter cultures, such as *streptococcus cremoris* and rod bacteria, such as meso- and thermophilic types, e.g. *Lactobacillus helveticus* og *L. bulgaricus*. When the acidification is completed after from 4 to 25 hours, preferably 6 to 12 hours, at a temperature of from 18° to 46° C., preferably from 18° to 22° C. for mesophilic bacteria and from 35° to 42° C. for thermophilic bacteria, a pH-value in the individual acidification tank of from 3.8 to 5.0 is obtained. At high temperatures low pH-values are obtained. The contents of the individual acidification tanks are mixed to form a desired final pH-value of from 4.5 to 5.6, preferably of from 4.6 to 4.8, most preferably 4.8, whereupon the desired salt concentration of from 0.8 to 8%, preferably 1.5 to 6%, is adjusted preferably by addition of finely ground sodium chloride crystals. Where a portion of the salt is constituted by large crystals it is possible to obtain a small-hole cheese as a cavity in the cheese is formed by the dissolution of the large crystals. With the addition of salt the acidified cheese milk is preserved, and further growth of the bacteria is discontinued. While supplying rennet, preferably a microbial rennet enzyme, the acidified cheese milk is then pumped into cheese moulds or preferably ready-made packings which are sealed hermetically. The packing units are preferably tins made from plastics or cartons containing from 0.1 to 5 liters, preferably from 0.25 to 0.5 liters. The units are subsequently subjected to a controlled heat treatment at a temperature of from about 18° C. to about 65° C., preferably from 35° C. to 65° C., preferably in the form of hot-air circulation, however, alternative forms of controlled heat treatment may be applied, such as immersion into a water bath. The heat treatment effects renneting and coagulation as well as a conditioning of the cheese so that a firmer texture is obtained at higher temperatures. The temperature used depends on the rennet enzyme used. Conventional calf stomach rennet does not tolerate temperatures above 42° C. before they are inactivated whereas the preferred enzyme from Mucor sp. tolerates temperatures of up to about 65° C. The heat treatment lasts from about 4 hours to about 36 hours, preferably from 6 hours to 24 hours. The duration depends i.a. on the volume of the packing units, as large volumes require more time. The heat treatment is decisive, i.a. for the final cheese texture and flavor.

II) According to a preferred embodiment of the invention an acidified retentate (pH=3.2 to 5.0, preferably 4.5) is produced from non-pasteurized ultra-filtrated milk wherein the acidification is based on bacteria derived from purchased cheese or whey from the previous day's cheese production, or the acidification is effected as self-acidification with the bacteria flora of the non-pasteurized milk proper, end rennet enzyme is optionally added to provide a stronger casein cleaving. Moreover it is preferred to carry out light preservation of the acidified retentate by adding about 2% of salt. The acidified ripened retentate is pasteurized and pasteurized non-acidified retentate (pH-value=about 6.6) is added in a 1:3 w:w ratio or in a ratio which ensures a pH-value= about 6.1 of the mixed retentate. At a pH-value of<about 6 there is a risk of bacteria encapsulation and incomplete pasteurization. The mixed retentate is pasteurized and then acidified as described above under I). Salt is subsequently added and the cheese milk is pumped into cheese molds or ready-made packages as described above under simultaneous addition of rennet. This embodiment makes it possible to accelerate the ripening of cheese with an inherent taste from lactic acid bacteria which are characteristic for a particular region, e.g. Tabriz, Curdistan, Egypt and Turkey, as the bacteria must act for a sufficiently long time in the acidifying retentate prior to pasteurization to form enzymes which in continued fermentation imparts a characteristic taste to the cheese. Depending on the pH-value obtained in the acidification, the acidified pasteurized retentate is added to the non-acidified retentate and preferably co-pasteurized therewith in a scraped surface heat exchanger or in a melting pot to inactivate the lactic acid bacteria. Cheese of the feta and domyati types or cream cheese is primarily produced which immediately obtains the desired ripening and taste.

III) According to a further preferred embodiment soft ripened cheese is produced as described above under I) and which may be acidified by different pure cultures. Following completed, heat treatment and when the desired ripening depth is present, indicating finished flavor development, the ripened cheese is stirred into fresh or thoroughly acidified retentate in an amount of from 5 to 25%, preferably 15%, whereby the gel forming ability of the casein is maintained. By stirring up to about 95% of retentate into ripened cheese a considerable volume increase of the ripened cheese is obtained without loss of taste and accelerated distribution of the cheese with inherent taste and ripening depth is achieved, and also e.g. cow-milk cheese acquires new taste characteristics when retentate from milk from other animal species is added.

IV) According to a further preferred embodiment a retentate is produced as described under I) above wherein from 3 to 9%, preferably about 5%, of a taste concentrate is added following acidification and whereupon the remaining cheese production proceeds as described under I).

The taste concentrate is produced from the permeate from ultra-filtrated milk wherein additional fat, such as milk fat, preferably in a concentration of from 0 to 10% and protein, preferably milk protein, e.g. casein, preferably in a concentration of from 1 to 15%, is added. The permeate thus enriched is inoculated with at least one bacteria culture in a number of tanks corresponding to the number of bacteria cultures and is allowed to ferment (ripen) at optimum temperature. The acid formed in the bacteria fermentation is neutralized in a manner known *per se*, preferably by addition of a base, such as sodium hydroxide or ammonia, so as not to impair the bacteria growth by a low pH-value, and accumulation of bacteria bio mass is effected. The fermented permeate is purified of bacteria, preferably by filtering off the biomass and it is filled into closed containers wherein the enzymatic activity released in the fermentation is maintained.

Retentate acidified according to the method described herein is added to the permeate thus enzyme-enriched following inactivation of the bacteria culture(s) used in the acidification of the retentate by salting whereby the ripening of the cheese is accelerated considerably and whereby it is made possible to provide considerable taste control as the enzyme-enriched permeate having different taste qualities may be stored and added to the acidified retentate according to wish. Alternatively the salting of the acidified retentate may be effected by means of a salt content in the fermented permeate. Cheeses produced with the addition of the taste concentrate described above are preferably firm sliceable cheese types which, accordingly, may be produced with inherent taste and/or ripening.

In the method according to the invention a wide range of cheeses, such as cream cheeses and fresh cheese spreads and soft, semi-firm and firm types made from milk from cows, mares, goats and sheep may be produced. No salt diffusion takes place in the cheeses, as the salt concentration is adjusted prior to the addition of rennet and the coagulation.

Milk, as used herein, includes all kinds of milk, such as whole milk, low-fat milk, skimmilk, buttermilk, etc., which may be pasteurized, sterilized, homogenized or in any other way methoded and wherein the milk components are optionally adjusted.

Furthermore preservatives are dispensable in case of direct pumping of acidified, salted rennet-added retentate into ready-made packings.

The taste variation and final pH-level in the cheeses are preferably obtained in the package by release of enzymes from the starter cultures in the heat treatment and in an optional subsequent storage ripening at ambient temperature.

In the production of cream cheese it may be necessary to add melting salts, such as citrates or phosphates, which may be carried out concurrently with the salt addition.

The method also permits the production of a very large number of cheese types in the same production plant by combining retentates acidified with different starter cultures. The cheese types may further be differentiated by the choice of heat treatment of the cheese in the sale package in its sealed state. Finally the production time is reduced substantially as ready-for-sale cheeses may be produced in from 7 to 14 days. The simultaneous salt- and rennet-addition relieves the work load considerably.

Where acidified retentate is pumped into cheese molds under simultaneous supply of rennet, the cheese moulds should be tight containers as the coagulation is not yet completed. Renneting and coagulation is effected in the cheese molds under separation of serum and following a suitable heat treatment as described above and the cheeses are taken out and dried and further processed in a manner known per se. Firm cheeses with a high content of dry matter, i.e. $\geq 50\%$ of dry matter, will receive surface treatment. Such cheeses may optionally be produced by mixing non-acidified retentate with the acidified retentate in connection with the rennet addition.

The invention also relates to cheese produced by the method and in particular the cheese types described in the following examples.

EXAMPLE 1

The production of domyati (Egyptian feta type)

Pasteurized, homogenized or non-homogenized whole milk (2000 kg) with standardized fat content is subjected to ultrafiltration (Alfa Laval AB ROMICON System, 50° C.) to obtain 38% of retentate dry matter. The fat content of the retentate dry matter thereby becomes 40%. The retentate is pasteurized at 76° C., transferred to an acidification tank and admixed with 2% of a flavor-poor starter (C.H.O.-culture No. 171 from Chr. Hansens Laboratorium). The acidification is effected at 26° C. for 18 hours and a final pH-value of 4.8 is obtained. Finely ground sodium chloride is subsequently added to obtain a salt content of 3.5%. Under simultaneous supply of cheese rennet, 20 g of 2% aqueous solution per kg of acidified retentate, the still fluid cheese curd is dosed into 500 gr packings which are closed immediately. A Mucor sp. rennet "Rennilase" from Novo Nordisk A/S is used. The packing units are then heat treated at 42° C. for 18 hours, and the units are stored at ambient temperature.

EXAMPLE 2

Production of Feta cheese

The production is effected as in example 1 except that the heat treatment is carried out at 50° C. for 10 hours.

EXAMPLE 3

Production of cream cheese

The production is effected as in example 1 except that the rennet enzyme is chymosine and that simultaneously with the sodium chloride addition melting salt is added in the form of citrate to obtain a melting salt content of 0.2% of the crude cheese weight. The treatment is carried out at 50° C. for 6 hours.

EXAMPLE 4

Production of firm sliceable cheese

The production is effected as in example 1 except that half of the retentate is not acidified but pasteurized and evaporated at 76° C. in a scraped surface heat exchanger with vacuum chamber (Alfa-Laval CONVAP) to obtain a dry matter content of 66% and is admixed with the acidified retentate/cheese curd (dry matter content of 44%) to which 3% of sodium chloride has been added. The total dry matter content is 55%. The heat treatment is carried out at 45° C. for 4.5 hours.

EXAMPLE 5

Production of domyati with inherent ripening depth

Crude cheese curd is produced in a closed container in an amount of from 0.5–25 kg, preferably in the milk-rich season, like in example 1 with differentiated dry matter and fat percentage to compensate for seasonal fluctuations.

The curd is taken out after 3 months and added to new production with a maximum of 25%, the cheese curd being, following stirring, passed to a mixer pipe where it is admixed with 75% of new acidified retentate and supply of rennilase (2% aqueous solution) and is dosed into ready-made packages.

The mixing ratio and standardization is balanced so that the finished product has the desired composition following which the curd is heat treated like in example 1.

EXAMPLE 6

Production of Feta cheese with inherent ripening depth

As in example 5 except, however, that heat treatment is carried out as in example 2.

We claim:

1. A method of producing cheese from ultrafiltration-concentrated milk comprising acidifying a starting retentate from the ultrafiltrated milk with at least one starter culture to obtain a fermented retentate with a pH value of from 4.5 to 5.6, adding an effective amount of salt, pumping the fermented retentate, while supplying rennet, into cheese molds or ready-made packages to obtain a curd, and heat treating the curd in said cheese molds or ready-made packages at from 18° to 65° C. for a period of from 4 to 36 hours.

2. The method according to claim 1, further comprising adding together with the salt, an effective amount of at least one additive to the fermented retentate.

3. The method according to claim 1, wherein, following acidification, said method further comprises adding a taste concentrate, said taste concentrate comprising a permeate obtained from the ultrafiltrated milk, wherein protein and optionally fat components are added to enrich the permeate, and which is inoculated with at least one bacteria culture and fermented under simultaneous neutralization of the acid formed and subsequently purified of bacteria.

4. The method according to claim 3, wherein the taste concentrate is added in an amount of from 3 to 9% by weight of the fermented retentate.

5. The cheese produced by the process of claim 1.

6. A method of producing cheese from ultrafiltration-concentrated milk comprising adding an acidified and subsequently pasteurized processed retentate to a starting retentate from the ultrafiltrated milk to form a mixture, acidifying the mixture with at least one starter culture to obtain a fermented mixture with a pH value of from 4.5 to 5.6, adding an effective amount of salt, pumping the fermented mixture, while supplying rennet, into cheese molds or ready-made packages to obtain a curd, and heat treating the curd in said cheese molds or ready-made packages at from 18° to 65° C. for a period of from 4 to 36 hours.

7. The method according to claim 6 further comprising adding, together with the salt, an effective amount of at least one additive to the fermented retentate.

8. The method according to claim 6, comprising acidifying the processed retentate with impure bacteria cultures having a known taste character.

9. The method according to claim 6, comprising adding the processed retentate having a pH-value of from 3.2 to 5.0 to obtain a pH value of above 6 in the mixture and pasteurizing the mixture prior to acidification.

10. The method according to claim 6, wherein, following acidification, said method further comprises adding a taste concentrate, said taste concentrate comprising a permeate from the ultrafiltrated milk, wherein protein and optionally fat components are added to enrich the permeate, and which is inoculated with at least one bacteria culture and fermented under simultaneous neutralization of the acid formed and subsequently purified of bacteria.

11. The method according to claim 10, wherein the taste concentrate is added in an amount of from 3 to 9% by weight of the fermented retentate.

12. The method according to claim 6, wherein the processed retentate is added in an amount of from 5% to 25% by weight of the mixture.

13. The method according to claim 6, wherein the processed retentate is ripened cheese which has been pasteurized.

14. The cheese produced by the process of claim 6.

15. A method of producing cheese from ultrafiltration-concentrated milk comprising acidifying a starting retentate from the ultrafiltrated milk with at least one starter culture to obtain a fermented retentate with a pH value of from 4.5 to 5.6, adding an acidified and subsequently pasteurized processed retentate to the fermented retentate to obtain a mixture, adding an effective amount of salt, pumping the mixture, while supplying rennet, into cheese molds or ready-made packages, and heat treating the mixture in said cheese molds or ready-made packages at from 18° to 65° C. for a period of from 4 to 36 hours.

16. The method according to claim 15, further comprising adding together with the salt, an effective amount of at least one additive to the fermented retentate.

17. The method according to claim 15, comprising acidifying the processed retentate with impure bacteria cultures having a known taste character.

18. The method according to claim 15, wherein, following acidification, said method further comprises adding a taste concentrate, said taste concentrate comprising a permeate from the ultrafiltrated milk, wherein protein and optionally fat components are added to enrich the permeate, and which is inoculated with at least one bacteria culture and fermented under simultaneous neutralization of the acid formed and subsequently purified of bacteria.

19. The method according to claim 18, wherein the taste concentrate is added in an amount of from 3 to 9% by weight of the fermented retentate.

20. The method according to claim 15, wherein the processed retentate is added in an amount of from 5% to 25% by weight of the mixture.

21. The method according to claim 15, wherein the processed retentate is ripened cheese which has been pasteurized.

22. The cheese produced by the process of claim 15.

* * * * *